June 19, 1962  J. C. HOELLE  3,039,658
VEHICLE FUEL PUMPING APPARATUS
Filed Sept. 8, 1959
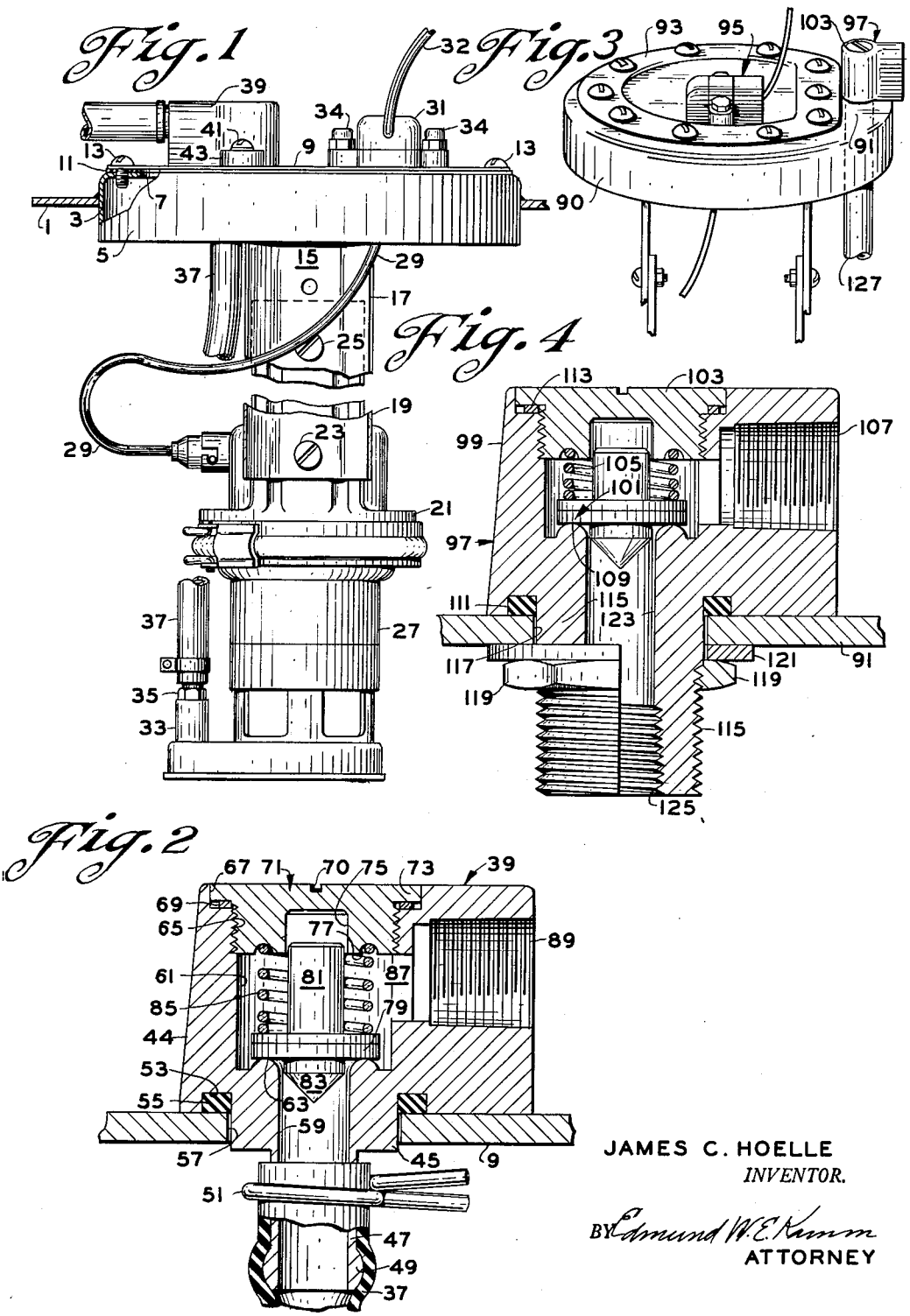
JAMES C. HOELLE
*INVENTOR.*
BY Edmund W. E. Kimm
ATTORNEY 3,039,658
VEHICLE FUEL PUMPING APPARATUS
James C. Hoelle, Fort Wayne, Ind., assignor to Tokheim Corporation, Fort Wayne, Ind., a corporation of Indiana
Filed Sept. 8, 1959, Ser. No. 838,724
6 Claims. (Cl. 222—180)

This invention relates to a vehicle fuel pumping apparatus. More specifically it relates to a structure which can be used in a multi-tank vehicle.

It is an object of the invention to provide a pumping apparatus which is capable of being used either singly or in a system comprising a number of similar units which may be operated separately to supply a common charge-forming device.

Another object of the invention is to provide a combined outlet fitting and check valve for use with a mounting structure for a submerged pump.

A further object is to provide a check valve which can be readily assembled, installed, repaired or replaced.

These and other objects will become apparent from a study of this specification and the drawings which are attached hereto, made a part hereof and in which:

FIGURE 1 is a front elevation of the preferred form of the apparatus, assembled and installed in a tank.

FIGURE 2 is cross-sectional view showing the fuel outlet fitting and check valve.

FIGURE 3 is a modified form of the apparatus shown in FIGURE 1.

FIGURE 4 is a cross-sectional view of the modified outlet fitting and check valve shown in FIGURE 3.

Referring first to FIGURES 1 and 2, the numeral 1 indicates a fuel tank having a round opening 3 into which is welded an adapter flange 5 having a circular top opening 7. A circular cover plate 9 is mounted on a gasket 11 and on the flange 5 by means of a number of screws 13.

An inverted, U-shaped bracket 15 has its connecting leg welded to the bottom of plate 9 and its free legs 17 extend downwardly in overlapping relation with two upstanding legs 19 which are fastened to a clamping bracket 21 by bolts 23. The respective overlapping legs are adjusted to provide the required length and are held together by bolts 25.

An electric motor driven pump 27 is removably clamped in said bracket and has a power supply cable 29 which terminates in a junction box 31 which also receives the input lead 32. The junction box is mounted on the top of the plate 9 by suitable bolts 34.

The liquid outlet 33 from the pump receives a fitting 35 on one end of the hose 37 while the other end of the hose is connected to the outlet fitting 39 which is mounted on the top of the plate 9 by screws or bolts 41 and body lugs 43.

Referring now to FIGURE 2, it will be seen that the fitting 39 comprises a body 44, preferably of metal, which has a downwardly extending circular boss 45 provided with a coaxial tubular extension 47 which terminates in a circumferential bead 49.

The hose 37 is slipped over the extension and is fastened thereon by a conventional hose clamp 51.

The body is recessed at 53, concentrically with the boss, to receive an O-shaped seal ring 55.

The boss is inserted in an opening 57 in the cover 9 and is clamped against the cover by the screws or bolts 41 (FIG. 1) which are inserted through holes, in the respective lugs 43 on the body, and in the cover. Two lugs 43, one on each side of the body, are preferably provided.

The body has an axial bore 59, which extends through the boss 45 and extension 47, and a counterbore 61, coaxial with the bore, extends downwardly from the top of the body. A valve seat 63 is formed at the junction of the bore and counterbore and the upper end of the counterbore is tapped at 65 and recessed at 67 to receive a gasket 69 and a screw plug 71.

The plug has a radial flange or head 73 which enters the recess to compress the gasket 69 against the body. The plug is also provided with a screwdriver slot 70.

A blind hole 75 is formed concentrically in the bottom of the plug and is surrounded by a shallow groove 77. A poppet type valve 79 has a stem 81 which is adapted to enter and be guided in hole 75. Preferably the valve also has a conical pilot 83, extending oppositely from the stem, adapted to enter the bore 59. A helical spring 85 has its upper end seated in groove 77 and its other end seated on the valve, to urge it toward the seat 63.

The fitting has a laterally directed bore 87 which communicates with the counterbore 61 and is tapped at 89 to receive the fitting of a discharge line (not shown).

The operation of the valve is obvious in that it prevents flow from the outlet 87, 89 back to the pump. This is necessary for systems comprising a number of tanks, each of which is equipped with a pump such as that shown in FIGURE 1. It is common practice to operate only one pump at a time and were the valve not provided, the operating pump would pump fuel from one tank to the other as well as to the engine, with the result that the required pressure at the carburetor could not be maintained and the tank receiving the fuel might be overfilled.

The valve 79 can be readily removed for repair or replacement by merely unscrewing the plug 71 and the entire fitting can be easily removed from the cover merely by removing the two bolts 41.

*Modified Form*

FIGURE 3 discloses a slightly different form of structure for mounting the motor pump unit in a tank.

In this form, the opening in the adapter flange 90 is D-shaped rather than circular, leaving a flat sector 91. The cover 93 is correspondingly D-shaped. An electrical connector 95 is mounted on the plate as described above but the fuel discharge fitting 97 is mounted on the flange sector rather than on the plate.

The fitting, as shown in detail in FIGURE 4, has a modified body 99, but the valve 101, plug 103, spring 105, outlet 107, valve seat 109 and gaskets 111 and 113 are like the corresponding parts of FIGURE 2. Instead of providing the body with the hose mounting tube 47, a boss 115 is provided which extends for a substantial distance through the opening 117 in the sector 91 and is externally threaded to receive a nut 119 which serves to clamp a washer 121 against the bottom of the sector, in order to draw the body down against the top of the sector, thereby compressing the gasket 111.

The bore 123 is taper tapped at its lower end, as shown at 125, to receive a mating fitting (not shown) which is mounted on the hose 127 leading from the pump.

Obviously the fitting may be assembled in the sector with its outlet oriented in the proper direction to receive the discharge line, before the nut 119 is tightened, to hold it in place in the desired position.

In other respects the device functions in the same manner as the preferred form.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires

I claim:

1. In a submerged pumping apparatus for a fuel tank defining a top opening, a closure structure for said opening which comprises an adapter flange fixed in said opening, defining a D-shaped through passage and having a sector shaped top wall portion adjacent said passage, and a cover for said passage, a bracket mounted at one end on said cover, a fuel pump mounted on the other end of said bracket, said bracket and pump being inserted through said passage, said pump having a discharge conduit, a fitting mounted on said sector shaped top wall portion, said fitting having one end extending through said closure structure and terminating in means for receiving and supporting said discharge conduit, said fitting terminating at its other end in means for receiving and supporting a delivery conduit, said fitting further defining a fluid discharge channel through said closure structure, having an inlet at said one end, communicating with said discharge conduit, an outlet at its other end communicating with said delivery conduit and a valve seat between said inlet and outlet, a valve mounted in said fitting for movement toward and from said seat, to control the flow through said channel and yieldable means for urging said valve closed.

2. The structure defined by claim 1 wherein said valve is disposed with respect to said seat so as to open with the flow of fuel from said inlet to said outlet.

3. The structure defined by claim 1 wherein the portion of said channel adjacent said outlet extends at an angle to the portion of said channel adjacent said inlet, and wherein said fitting defines a counterbore substantially coaxial with said inlet portion and defines said seat substantially at the bottom of the counterbore, a valve mounted in said counterbore, a spring in said counterbore and having one end seated on said valve, a plug removably mounted on said fitting to seal said counterbore, the other end of said spring being seated on said plug so as to be compressed thereby.

4. The structure defined by claim 3 wherein said valve includes a stem and said plug defines a pilot bore for receiving and guiding said stem.

5. The structure defined by claim 1 wherein said fitting defines a boss, surrounding said inlet passage, and an annular groove surrounding said boss to receive a seal ring, and mounting lugs on said fitting adapted to receive fastening means, said lugs and fastening means being disposed so as to apply pressure in a driection to compress said gasket.

6. The structure defined by claim 1, wherein said fitting defines a boss surrounding said inlet passage and an annular groove surrounding said boss to receive a seal ring, said sealing and fastening means being disposed on opposite sides of said top wall portion whereby said fastening means applies pressure in a direction to compress said gasket and to seat said fitting on said portion, said boss being externally threaded to receive fastening means.

References Cited in the file of this patent

UNITED STATES PATENTS

| | | |
|---|---|---|
| 2,143,399 | Ambercrombie | Jan. 10, 1939 |
| 2,319,934 | Korte et al. | May 25, 1943 |
| 2,409,245 | Black | Oct. 15, 1946 |
| 2,531,980 | Johnson | Nov. 28, 1950 |
| 2,547,246 | Aspelin | Apr. 3, 1951 |
| 2,547,761 | Korte | Apr. 3, 1951 |
| 2,920,690 | Wright | Jan. 12, 1960 |